US008384708B2

(12) United States Patent
Moon

(10) Patent No.: US 8,384,708 B2
(45) Date of Patent: Feb. 26, 2013

(54) APPARATUS AND METHOD FOR DIVIDING LIQUID CRYSTAL DISPLAY DEVICE

(75) Inventor: Su-Hwan Moon, Gumi-si (KR)

(73) Assignee: LG Display Co., Ltd., Seoul (KR)

( * ) Notice: Subject to any disclaimer, the term of this patent is extended or adjusted under 35 U.S.C. 154(b) by 221 days.

(21) Appl. No.: 12/849,709

(22) Filed: Aug. 3, 2010

(65) Prior Publication Data

US 2011/0032249 A1 Feb. 10, 2011

(30) Foreign Application Priority Data

Aug. 4, 2009 (KR) ........................ 10-2009-0071761

(51) Int. Cl.
*G09G 3/36* (2006.01)
*G09G 5/00* (2006.01)
*G09G 3/34* (2006.01)
*G06F 3/038* (2006.01)

(52) U.S. Cl. ........................... 345/214; 345/84; 345/104

(58) Field of Classification Search ............ 345/87–104, 345/139, 204–213
See application file for complete search history.

(56) References Cited

U.S. PATENT DOCUMENTS

| | | | | |
|---|---|---|---|---|
| 7,605,788 | B2 * | 10/2009 | Kamada et al. | 345/89 |
| 7,804,473 | B2 * | 9/2010 | Kumeta | 345/96 |
| 7,847,773 | B2 * | 12/2010 | Chiang et al. | 345/93 |
| 2006/0061535 | A1 * | 3/2006 | Kim et al. | 345/98 |
| 2007/0247410 | A1 * | 10/2007 | Yoshimoto | 345/98 |
| 2008/0150871 | A1 * | 6/2008 | Park | 345/98 |
| 2009/0146938 | A1 * | 6/2009 | Takada et al. | 345/98 |
| 2009/0278782 | A1 * | 11/2009 | Chen | 345/100 |
| 2010/0259512 | A1 * | 10/2010 | Lin et al. | 345/204 |

* cited by examiner

*Primary Examiner* — Kent Chang
*Assistant Examiner* — Nathan Brittingham
(74) *Attorney, Agent, or Firm* — Birch, Stewart, Kolasch & Birch, LLP

(57) ABSTRACT

An apparatus and method for driving a Liquid Crystal Display (LCD) device are disclosed. The apparatus includes a liquid crystal panel in which a plurality of subpixels arranged on each horizontal line are commonly connected to at least one adjacent data line, and on at least one horizontal line basis, a plurality of subpixels are connected to at least one adjacent data line through Thin Film Transistors (TFTs) of the subpixels from a same direction with respect to the at least one adjacent data line, a data driver for driving a plurality of data lines, a gate driver for driving a plurality of gate lines, and a timing controller for arranging externally received image data according to arrangement of subpixel columns commonly connected to each data line, providing the arranged image data to the data driver, and controlling driving timings of the gate driver and the data driver.

7 Claims, 6 Drawing Sheets

APPARATUS AND METHOD FOR DIVIDING LIQUID CRYSTAL DISPLAY DEVICE

This application claims the benefit of Korean Patent Application No. 10-2009-0071761, filed on Aug. 4, 2009, which is hereby incorporated by reference as if fully set forth herein.

BACKGROUND OF THE INVENTION

1. Field of the Invention

The present invention relates to a Liquid Crystal Display (LCD) device, and more particularly, to an apparatus and method for driving an LCD device so as to reduce the number of data driving Integrated Circuits (ICs) and overcome the degradation of image quality caused by the difference between the parasitic capacitances of pixel columns.

2. Discussion of the Related Art

An LCD device displays an image, relying on the electrical and optical characteristics of liquid crystals. The liquid crystals exhibit different anisotropic properties in dielectric constant and refractive index according to long and short molecular axes. The molecular arrangement and optical properties of the liquid crystals are easy to control. The LCD device having these features displays images by controlling the transmittance of light that passes through polarizers through changing the orientation of liquid crystal molecules.

The LCD device includes a liquid crystal panel having a plurality of pixels arranged in a matrix, a gate driver for driving gate lines of the liquid crystal panel, and a data driver for driving data lines of the liquid crystal panel.

Each pixel of the liquid crystal panel represents an intended color by combining Red (R), Green (G) and Blue (B) color subpixels that control light transmittance according to data signals. Each subpixel includes a Thin Film Transistor (TFT) connected to a gate line and a data line and a liquid crystal capacitor connected to the TFT. The liquid crystal capacitor controls the light transmittance by charging the difference voltage between a data signal provided to a pixel electrode and a common voltage supplied to a common electrode and driving a liquid crystal according to the charged voltage.

The gate driver includes a plurality of gate ICs for sequentially driving the gate lines of the liquid crystal panel.

The data driver includes a plurality of data ICs for converting digital data signals to analog data signals and providing the analog data signals to the data lines of the liquid crystal panel, whenever each gate line is driven.

Since a data IC includes complex circuits such as a digital-to-analog converter, etc., its fabrication cost is high. Also, more data ICs than gate ICs are required because the liquid crystal panel has more data lines than gate lines. Accordingly, techniques for reducing the number of data ICs, while maintaining the resolution of a liquid crystal panel at the same level have been proposed.

For instance, a liquid crystal panel with a reduced number of data lines has been proposed, in which every pair of adjacent subpixels share one data line, that is, every pair of adjacent subpixel columns share a single data line interposed between them, to thereby reduce the number of data ICs.

However, when subpixels are disposed at both sides of a data line to reduce the number of data ICs, the difference between the parasitic capacitances of TFTs connected at both sides of each data line causes a flicker phenomenon.

To be more specific, the capacitance of a gate/source electrode differs from that of a gate/drain electrode in the TFTs of pixel columns at both sides of each data line in view of the nature of the fabrication process of the TFTs. The resulting difference in parasitic capacitance between adjacent pixel columns connected to each data line leads to the flicker phenomenon, thus degrading image quality. Moreover, considering the recent trend of displays toward large size, there exists a need for an LCD device that further decreases the number of data ICs and prevents image quality degradation, compared to the conventional LCD device structure with a reduced number of data ICs.

SUMMARY OF THE INVENTION

Accordingly, the present invention is directed to an apparatus and method for driving a Liquid Crystal Display (LCD) device that substantially obviate one or more problems due to limitations and disadvantages of the related art.

An object of the present invention is to provide an apparatus and method for driving an LCD device in order to reduce the number of data driving ICs and improve image quality degraded by the difference between the parasitic capacitances of pixel columns.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, an apparatus for driving an LCD device includes a liquid crystal panel in which a plurality of subpixels arranged on each horizontal line are commonly connected to at least one adjacent data line, and on at least one horizontal line basis, a plurality of subpixels are connected to at least one adjacent data line through Thin Film Transistors (TFTs) of the subpixels from a same direction with respect to the at least one adjacent data line, a data driver for driving a plurality of data lines, a gate driver for driving a plurality of gate lines, and a timing controller for arranging externally received image data according to arrangement of subpixel columns commonly connected to each data line, providing the arranged image data to the data driver, and controlling driving timings of the gate driver and the data driver.

In the liquid crystal panel, a plurality of subpixels of a same color may be arranged along each of the gate lines, a plurality of subpixels of three colors may be arranged along each of the data lines, subpixels of $(4k\text{-}3)^{th}$ and $(4k\text{-}1)^{th}$ columns may be commonly connected to a same data line, and subpixels of $(4k\text{-}2)^{th}$ and $4k^{th}$ columns may be commonly connected to a same data line, k being a natural number larger than 1.

Odd-numbered data lines among the plurality of data lines may be branched to be connected to TFTs of the subpixels of $(4k\text{-}3)^{th}$ and $(4k\text{-}1)^{th}$ columns so that the subpixels of $(4k\text{-}3)^{th}$ and $(4k\text{-}1)^{th}$ columns are connected in parallel to the same data lines, even-numbered data lines among the plurality of data lines may be branched to be connected to TFTs of the subpixels of $(4k\text{-}2)^{th}$ and $4k^{th}$ columns so that the subpixels of $(4k\text{-}2)^{th}$ and $4k^{th}$ columns are connected in parallel to the same data lines, the subpixels of $(4k\text{-}3)^{th}$ and $(4k\text{-}2)^{th}$ columns may be connected to odd-numbered gate lines, and the subpixels of $(4k\text{-}1)^{th}$ and $4k^{th}$ columns may be connected to even-numbered gate lines.

In a period for displaying an image on at least one frame basis, the timing controller may control an image to be displayed at pixels of the $(4k\text{-}3)^{th}$ and $(4k\text{-}2)^{th}$ columns during at least one half of a horizontal period or during one horizontal period, and may control an image to be displayed at pixels of $(4k-1)^{th}$ and $4k^{th}$ columns during the other half of the horizontal period or during a next horizontal period.

In the liquid crystal panel, a plurality of subpixels of a same color may be arranged along each of the gate lines, a plurality of subpixels of three colors may be arranged along each of the data lines, subpixels of $(4k-3)^{th}$ and $(4k-1)^{th}$ columns in each odd-numbered row may be commonly connected to a same data line, subpixels of $(4k-2)^{th}$ and $4k^{th}$ columns in each odd-numbered row may be commonly connected to a same data line, subpixels of the $(4k-2)^{th}$ and $4k^{th}$ columns in each even-numbered row may be commonly connected to a same data line, and subpixels of the $(4k-3)^{th}$ and $(4k-1)^{th}$ columns in each even-numbered row may be commonly connected to a same data line.

The subpixels of the $(4k-3)^{th}$ and $(4k-2)^{th}$ columns in each odd-numbered row may be connected to odd-numbered gate lines, the subpixels of the $(4k-1)^{th}$ and $4k^{th}$ columns in each odd-numbered row may be connected to even-numbered gate lines, the subpixels of the $(4k-2)^{th}$ and $(4k-1)^{th}$ columns in each even-numbered row may be connected to the odd-numbered gate lines, the subpixels of the $(4k-3)^{th}$ and $4k^{th}$ columns in each even-numbered row may be connected to the even-numbered gate lines.

In a period for displaying an image on at least one frame basis, the timing controller may control an image to be displayed at pixels of the $(4k-3)^{th}$ and $(4k-2)^{th}$ columns during an odd-numbered horizontal period or during one half of the odd-numbered horizontal period and control an image to be displayed at pixels of $(4k-1)^{th}$ and $4k^{th}$ columns during the other half of the odd-numbered horizontal period or during one horizontal period, and during the period for displaying an image on at least one frame basis, the timing controller may control an image to be displayed at the pixels of the $(4k-2)^{th}$ and $(4k-1)^{th}$ columns during an even-numbered horizontal period or during one half of the even-numbered horizontal period and control an image to be displayed at the pixels of $(4k-3)^{th}$ and $4k^{th}$ columns during the other half of the even-numbered horizontal period or during one horizontal period.

In another aspect of the present invention, a method for driving an LCD device having a liquid crystal panel in which a plurality of subpixels arranged on each horizontal line are commonly connected to at least one adjacent data line, and on at least one horizontal line basis, a plurality of subpixels are connected to at least one adjacent data line through TFTs of the subpixels from a same direction with respect to the at least one adjacent data line, includes driving a plurality of data lines, driving a plurality of gate lines, and arranging externally received image data according to arrangement of subpixel columns commonly connected to each data line, and controlling a driving timing of the data lines, so that the arranged image data are displayed at the subpixels through the plurality of data lines.

For controlling a driving timing of the data lines, an image may be controlled to be displayed at pixels of the $(4k-3)^{th}$ and $(4k-2)^{th}$ columns during at least one half of a horizontal period or during one horizontal period in a period for displaying an image on at least one frame basis, and an image may be controlled to be displayed at pixels of $(4k-1)^{th}$ and $4k^{th}$ columns during the other half of the horizontal period or during a next horizontal period in the period for displaying an image on at least one frame basis.

For controlling a driving timing of the data lines, an image may be controlled to be displayed at pixels of the $(4k-3)^{th}$ and $(4k-2)^{th}$ columns during an odd-numbered horizontal period or during one half of the odd-numbered horizontal period in a period for displaying an image on at least one frame basis, an image may be controlled to be displayed at pixels of $(4k-1)^{th}$ and $4k^{th}$ columns during the other half of the odd-numbered horizontal period or during one horizontal period in the period for displaying an image on at least one frame basis, an image may be controlled to be displayed at the pixels of the $(4k-2)^{th}$ and $(4k-1)^{th}$ columns during an even-numbered horizontal period or during one half of the even-numbered horizontal period in the period for displaying an image on at least one frame basis, and an image may be controlled to be displayed at the pixels of $(4k-3)^{th}$ and $4k^{th}$ columns during the other half of the even-numbered horizontal period or during one horizontal period in the period for displaying an image on at least one frame basis.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 1:
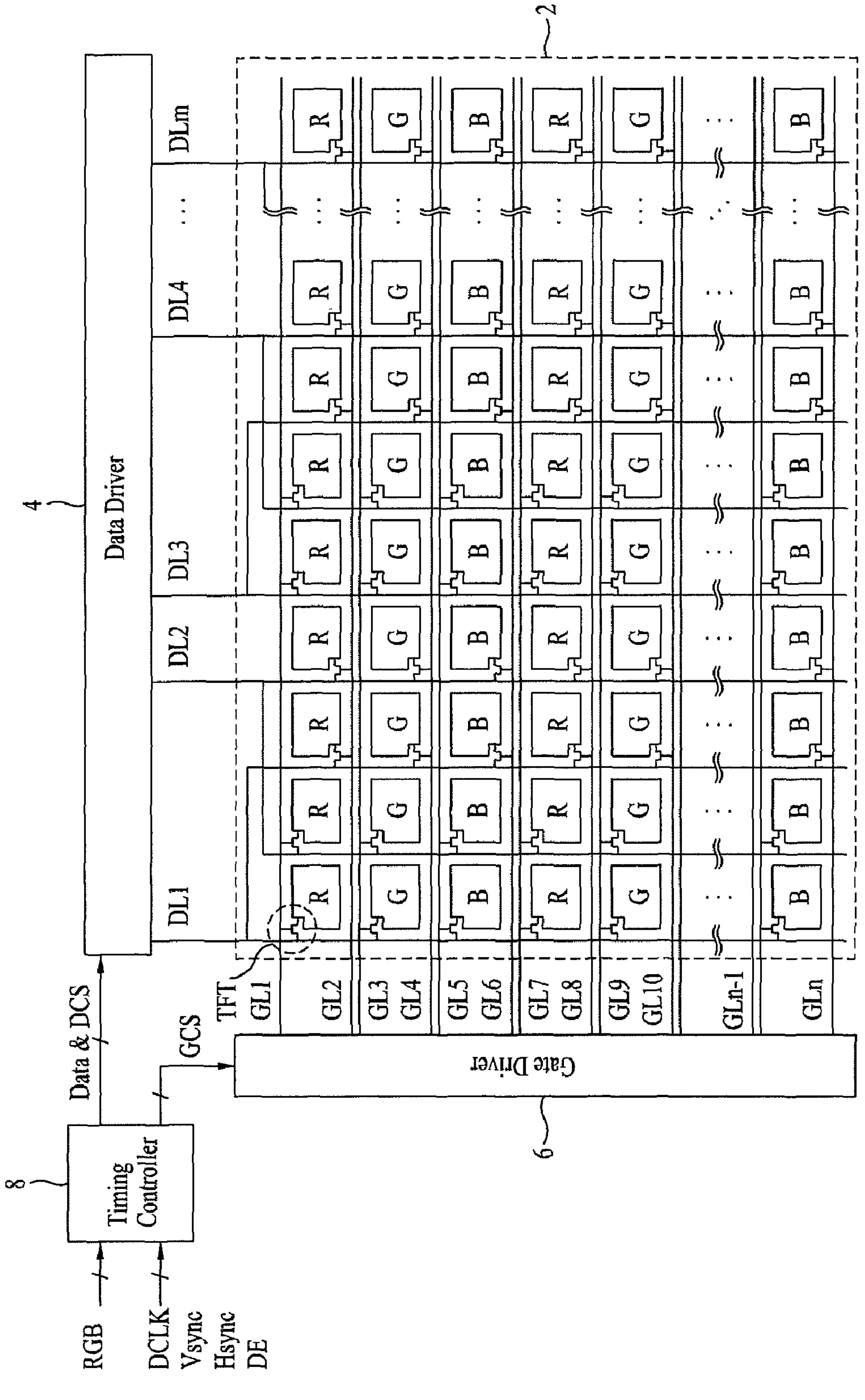
FIG. 1 illustrates the configuration of a Liquid Crystal Display (LCD) device according to an exemplary embodiment of the present invention.

FIG. 1 illustrates the configuration of a Liquid Crystal Display (LCD) device according to an exemplary embodiment of the present invention.

Referring to FIG. 1, the LCD device includes a liquid crystal panel 2 in which a plurality of Red (R), Green (G) or Blue (B) color subpixels arranged on each horizontal line are commonly connected to at least one adjacent data line, and on at least one horizontal line basis, a plurality of R, G or B color subpixels are connected to their adjacent data line through their Thin Film Transistors (TFTs) in the same direction with respect to the data line, a data driver 4 for driving a plurality of data lines DL1 to DLm, a gate driver 6 for driving a plurality of gate lines GL1 to GLn, and a timing controller 8 for arranging externally received RGB image data according to the arrangement of subpixel columns commonly connected to each data line, providing the arranged RGB image data to the data driver 4, generating a gate control signal GCS and a data control signal DCS, and controlling the gate driver 6 and the data driver 4 with the gate control signal GCS and the data control signal DCS.

A plurality of subpixels that form a pixel matrix in the liquid crystal panel 2 are divided into R, G and B color subpixels and occupy in areas defined by the plurality of data lines DL1 to DLm and the plurality of gate lines GL1 and GLn. In FIG. 1, the liquid crystal panel 2 is horizontally striped, in which the same-color subpixels are arranged along each of the gate lines GL1 to GLn and R, G and B color subpixels alternate with one another along each of the data lines DL1 to DLm. When needed, the liquid crystal panel 2 may be configured to be vertically striped by arranging the same-color subpixels along each of the data lines DL1 to DLm. Yet, only an LCD device configuration that enables reduction of the number of data ICs to up to ⅙ will be described with reference to FIG. 1.

More specifically, a plurality of R, G and B color subpixels are interposed between odd-numbered gate lines GL1, GL3, GL5, . . . , GLn-1 and even-numbered gate lines GL2, GL4, GL6, . . . , GLn. Among the subpixels, subpixels in $(4k\text{-}3)^{th}$ and $(4k\text{-}1)^{th}$ columns are commonly connected to the same data lines, and subpixels in $(4k\text{-}2)^{th}$ and $4k^{th}$ columns are commonly connected to the same data lines. For this purpose, each of odd-numbered data lines DL1, DL3, DL5, . . . , DLm-1 is branched to be connected to the TFTs of subpixels in the $(4k\text{-}3)^{th}$ and $(4k\text{-}1)^{th}$ columns, so that the subpixels in the $(4k\text{-}3)^{th}$ and $(4k\text{-}1)^{th}$ columns are connected in parallel to the same data lines. Also, each of even-numbered data lines DL2, DL4, DL6, . . . , DLm is branched to be connected to the TFTs of subpixels in the $(4k\text{-}2)^{th}$ and $4k^{th}$ columns, so that the subpixels in the $(4k\text{-}2)^{th}$ and $4k^{th}$ columns are connected in parallel to the same data lines.

ALL R, G and B color subpixels of the liquid crystal panel 2 are connected to the data lines DL1 to DLm that are extended in the same directions, that is, along one sides of the R, G and B color subpixels. Among the R, G and B color subpixels, subpixels in the $(4k\text{-}3)^{th}$ and $(4k\text{-}2)^{th}$ columns are connected to the odd-numbered gate lines GL1, GL3, GL5, . . . , GLn-1, whereas subpixels in the $(4k\text{-}1)^{th}$ and $4k^{th}$ columns are connected to the even-numbered gate lines GL2, GL4, GL6, . . . , GLn. Thus the subpixels in the $(4k\text{-}3)^{th}$ and $(4k\text{-}1)^{th}$ columns and the subpixels in the $(4k\text{-}2)^{th}$ and $4k^{th}$ columns are driven on a frame basis by the gate lines GL1 to GLn-1 that are sequentially driven.

It may be further contemplated that the subpixels in the $(4k\text{-}3)^{th}$ and $(4k\text{-}2)^{th}$ columns and the subpixels in the $(4k\text{-}1)^{th}$ and $4k^{th}$ columns are driven separately on an odd-numbered frame basis and on an even-numbered frame basis by sequentially driving the odd-numbered gate lines GL1, GL3, GL5, . . . , GLn-1 only in odd-numbered frames and even-numbered gate lines GL2, GL4, GL6, . . . , GLn only in even-numbered frames. In this case, the subpixels may be driven such that image signals are charged longer, compared to a method for driving all R, G and B color subpixels on a frame basis. Yet, the following description is made with the appreciation that all R, G and B color subpixels are driven by the single gate driver 6 on a frame basis, by way of example.

The data driver 4 converts image data arranged on a frame basis or on an odd-numbered/even-numbered frame basis, received from the timing controller 8, to analog voltages, that is, image signals using data the control signal DCS received from the timing controller 8, for instance, a Source Start Pulse (SSP), a Source Shift Clock (SSC), and a Source Output Enable (SOE) signal.

Specifically, the data driver 4 latches image data received from the timing controller 8 in response to the SSC, provides image signals for one horizontal line to the data lines DL1 to DLm in every horizontal period during which scan pulses are provided to the gate lines GL1 to GLn. Herein, the data driver 4 selects positive or negative gamma voltages having predetermined levels according to the gray levels of the arranged image data in response to a polarity control signal received from the timing controller 8 and supplies the selected gamma voltages as image signals to the data lines DL1 to DLm. As described above, the data driver 4 provides positive or negative image signals to the data lines DL1 to DLm in such a manner that the polarities of the R, G and B pixels of the liquid crystal panel 2 are inverted on a frame basis.

The gate driver 6 sequentially generates scan pulses in response to the gate control signal GCS received from the timing controller 8, for example, a Gate Start Pulse (GSP), a Gate Shift Clock (GSC), and a Gate Output Enable (GOE) signal, and sequentially supplies the scan pulses, for example, gate-on voltages to the gate lines GL1 to GLn connected to the gate driver 6. The gate driver 6 supplies gate-off voltages to the gate lines G11 to GLn when the gate-on voltages are not supplied to them. The gate driver 6 controls the pulse width of the scan pulses according to the GOE signal.

The timing controller 8 arranges externally received RGB image data suitably for driving of the liquid crystal panel 2 and provides the arranged RGB image data to the data driver 4 on a frame basis or an odd-numbered/even-numbered frame basis. Specifically, the timing controller 8 arranges the input RGB image data and provides the data driver 4 with the arranged RGB image data so that an image may be displayed at the subpixels of the $(4k\text{-}3)^{th}$ and $(4k\text{-}1)^{th}$ columns connected to the same data lines and at the subpixels of the $(4k\text{-}2)^{th}$ and $4k^{th}$ columns connected to the same data lines during each frame period.

Also, the timing controller 8 generates the gate control signal GCS and the data control signal DCS using at least one of externally received synchronization signals, that is, a dot clock signal DCLK, a data enable signal DE, and horizontal and vertical synchronization signals Hsync and Vsync and provides the data control signal GCS and the data control signal DCS to the gate driver 6 and the data driver 4, thereby controlling the gate driver 6 and the data driver 4, respectively.

Figure 2:
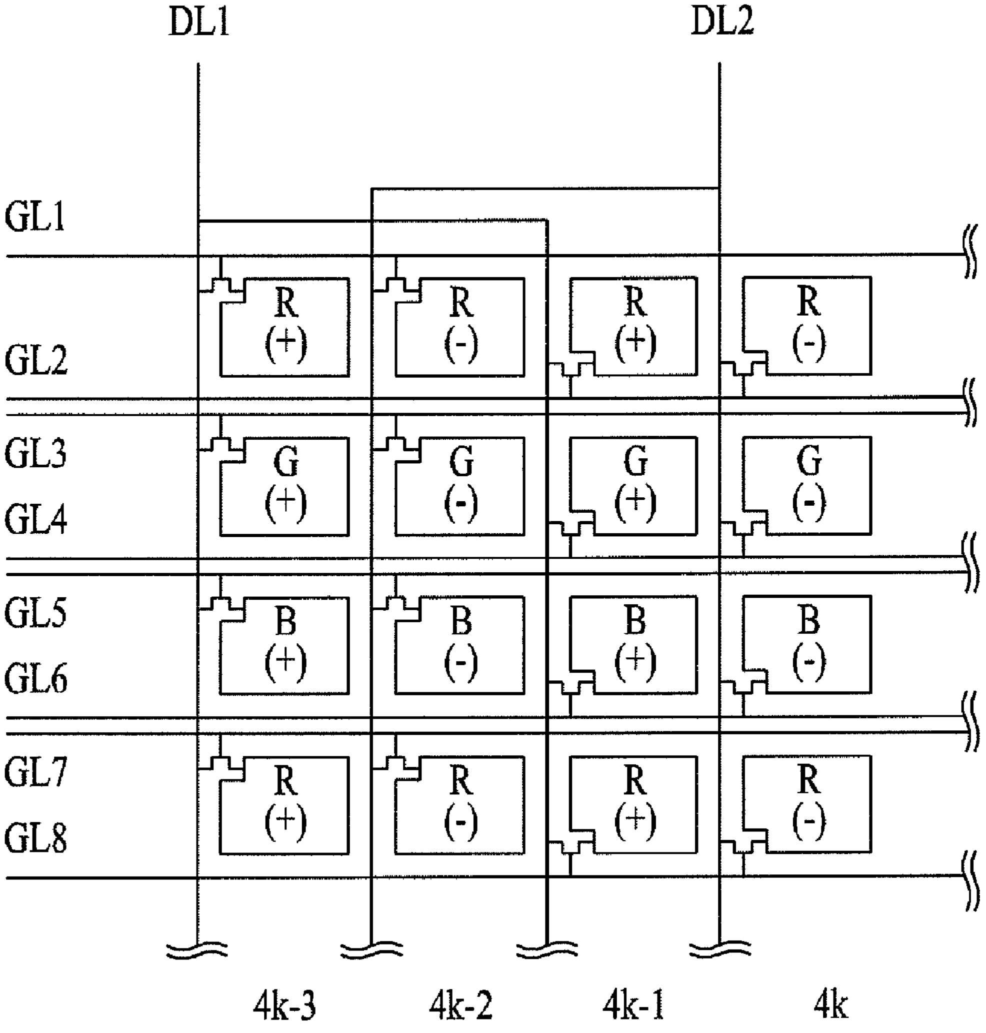
FIG. 2 illustrates subpixels charged with image signals during each frame period.
Figure 3:
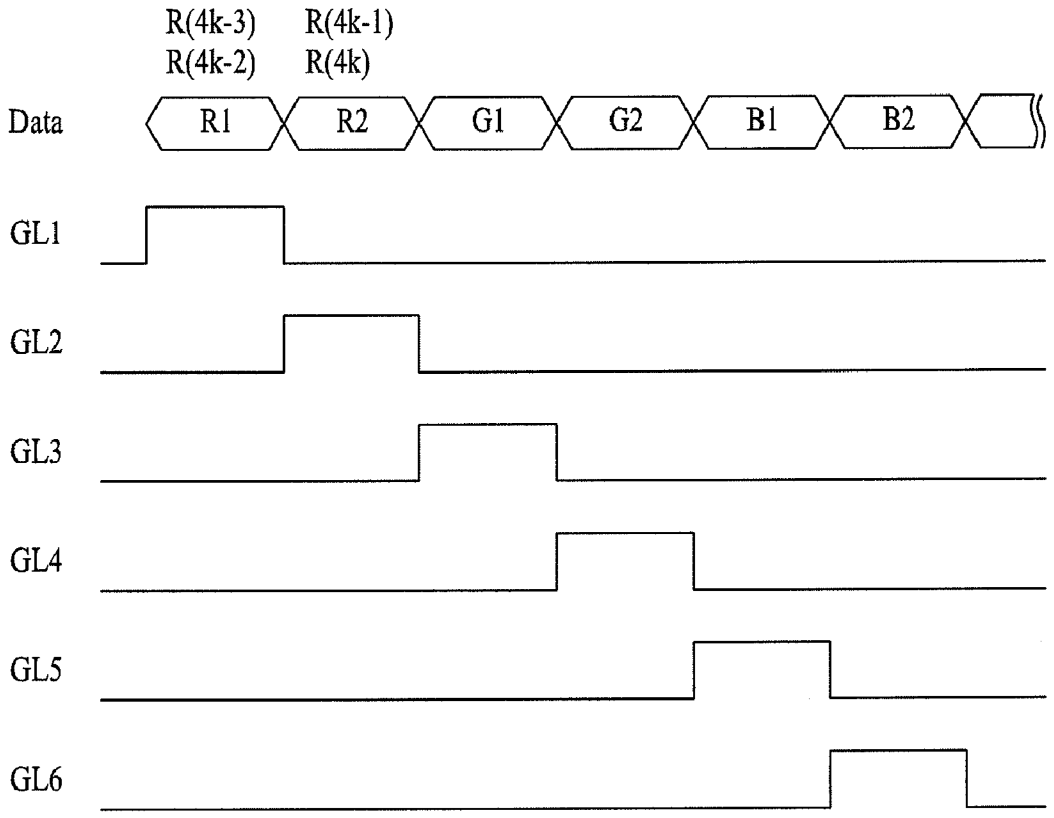
FIG. 3 is a waveform diagram referred to for describing a method for driving a liquid crystal panel illustrated in FIG. 2.

FIG. 2 illustrates subpixels charged with image signals during each frame period and FIG. 3 is a waveform diagram referred to for describing a method for driving the liquid crystal panel illustrated in FIG. 2.

Referring to FIG. 2, in order to save power, the liquid crystal panel 2 is driven by inverting the polarities of the data lines DL1 to DLm in each frame such that the polarity of the odd-numbered data lines DL1, DL3, DL5, . . . , DLm-1 is opposite to the polarity of the even-numbered data lines DL2, DL4, DL6, . . . , DLm according to a column inversion technique. Therefore, the subpixels in the $(4k\text{-}3)^{th}$ and $(4k\text{-}1)^{th}$ columns connected to the odd-numbered data lines DL1, DL3, DL5, . . . , DLm-1 are charged with data of the same polarity, whereas the subpixels in the $(4k\text{-}2)^{th}$ and $4k^{th}$ columns connected to the even-numbered data lines DL2, DL4, DL6, . . . , DLm are charged with data of the polarity opposite to the polarity of the data charged in the subpixels in the $(4k\text{-}3)^{th}$ and $(4k\text{-}1)^{th}$ columns. The polarities of the subpixels are inverted on a frame basis.

Referring to FIG. 3, to display an image during each frame period, the timing controller 8 arranges RGB image data and provides the arranged RGB image data to the data driver 4 each time for at least one horizontal line such that an image is displayed at the pixels of the $(4k\text{-}3)^{th}$ and $(4k\text{-}1)^{th}$ columns during one half of one horizontal period and at the pixels of the (4$k$-2)$^{th}$ and 4$k^{th}$ columns during the other half of the horizontal period. The timing controller 8 also generates the gate control signal GSC and the data control signal DCS and provides the gate control signal GSC and the data control signal DCS respectively to the gate driver 6 and the data driver 4.

The data driver 4 converts the arranged image data to analog image signals and provides the analog image signals to the data lines DL1 to DLm on a half horizontal period basis in such a manner that an image is displayed at the pixels of the (4$k$-3)$^{th}$ and (4$k$-2)$^{th}$ columns during one half of one horizontal period and at the pixels of the (4$k$-1)$^{th}$ and 4$k^{th}$ columns during the other half of the horizontal period. The gate driver 6 sequentially supplies gate-on voltages to the gate lines GL1 to GLn in every half horizontal period. During a period in which gate-on voltages are not supplied to the gate lines GL1 to GLn, gate-off voltages are supplied to them.

Therefore, among the R color subpixels arranged in the uppermost horizontal row, the R color subpixels of the (4$k$-3)$^{th}$ and (4$k$-2)$^{th}$ pixel columns to which a gate-on voltage is supplied through the first gate line GL1 are charged with R image signals R1 provided through the data lines DL1 to DLm, as illustrated in FIG. 2. Then the R color subpixels of the (4$k$-1)$^{th}$ and 4$k$-2$^{th}$ pixel columns to which a gate-on voltage is supplied through the second gate line GL2 among the R color subpixels arranged in the uppermost horizontal row are charged with R image signals R2 provided through the data lines DL1 to DLm.

Subsequently, the G color subpixels of the (4$k$-3)$^{th}$ and (4$k$-2)$^{th}$ pixel columns to which a gate-on voltage is supplied through the third gate line GL3 among the G color subpixels arranged in the second horizontal row are charged with G image signals G1 provided through the data lines DL1 to DLm. Then the G color subpixels of the (4$k$-1)$^{th}$ and 4$k$-2$^{th}$ pixel columns to which a gate-on voltage is supplied through the fourth gate line GL4 among the G color subpixels arranged in the second horizontal row are charged with G image signals G2 provided through the data lines DL1 to DLm. In this manner, subpixels connected to the gate lines GL1 to GLn to which gate-on voltages are sequentially supplied are sequentially charged with image signals R1 to B2 during every frame period, thus displaying an image.

As described above, the LCD device according to the exemplary embodiment of the present invention can reduce the number of data driving ICs in the data driver 4 by three to six times, compared to a conventional liquid crystal panel. In addition, since among the subpixels of the liquid crystal panel 2, the subpixels in the (4$k$-3)$^{th}$ and (4$k$-1)$^{th}$ pixel columns share the same data lines and the subpixels in the (4$k$-2)$^{th}$ and 4$k^{th}$ pixel columns share the same data lines, the TFTs of the R, G and B color subpixels are connected to the data lines DL1 to DLm from the same direction. Thus, the present invention improves image quality degraded by the difference between the parasitic capacitances of TFTs and further reduces power consumption as well.

Figure 4:
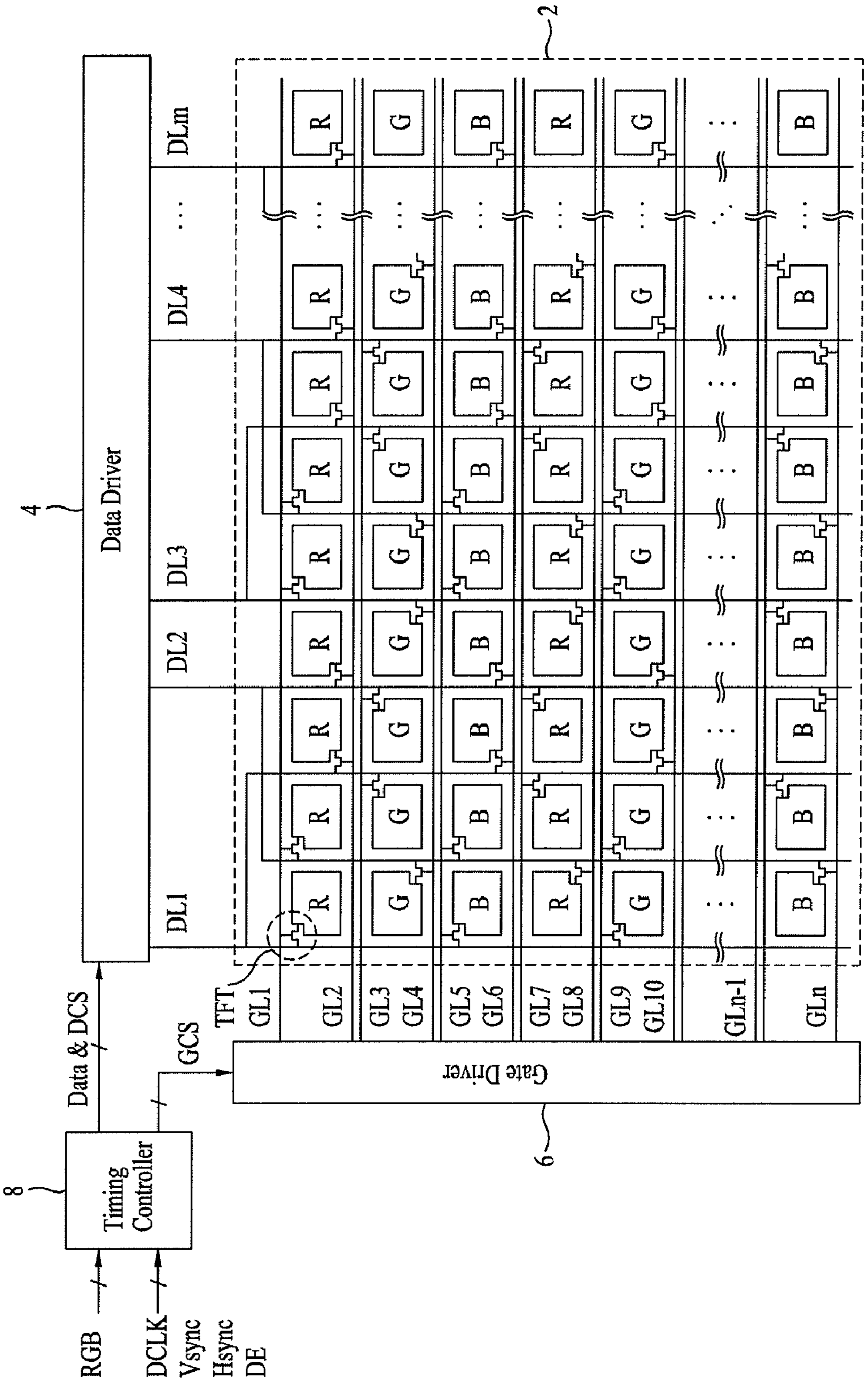
FIG. 4 illustrates the configuration of an LCD device according to another exemplary embodiment of the present invention.

FIG. 4 illustrates the configuration of an LCD device according to another exemplary embodiment of the present invention.

Referring to FIG. 4, the LCD device includes the liquid crystal panel 2 in which subpixels of (4$k$-3)$^{th}$ and (4$k$-1)$^{th}$ columns in odd-numbered rows are commonly connected to the same data lines, subpixels of (4$k$-2)$^{th}$ and 4$k^{th}$ columns in the odd-numbered rows are commonly connected to the same data lines, subpixels of the (4$k$-2)$^{th}$ and 4$k^{th}$ columns in even-numbered rows are commonly connected to the same data lines, subpixels of the (4$k$-3)$^{th}$ and (4$k$-1)$^{th}$ columns in the even-numbered rows are commonly connected to the same data lines, the data driver 4 for driving the plurality of data lines DL1 to DLm, the gate driver 6 for driving a plurality of gate lines GL1 to GLn, and the timing controller 8 for arranging externally received RGB image data according to the arrangement of subpixel columns commonly connected to each data line, providing the arranged RGB image data to the data driver 4, generating a gate control signal GCS and a data control signal DCS, and controlling the gate driver 6 and the data driver 4 with the gate control signal GCS and the data control signal DCS.

A plurality of subpixels that form a pixel matrix in the liquid crystal panel 2 are divided into R, G and B color subpixels and occupy in areas defined by the plurality of data lines DL1 to DLm and the plurality of gate lines GL1 and GLn.

The plurality of R, G and B color subpixels are interposed between the odd-numbered gate lines GL1, GL3, GL5, . . . , GLn-1 and the even-numbered gate lines GL2, GL4, GL6, . . . , GLn. In accordance with this exemplary embodiment, among the R, G and B color subpixels, subpixels of the (4$k$-3)$^{th}$ and (4$k$-1)$^{th}$ columns in the odd-numbered rows are commonly connected to the same data lines, subpixels of the (4$k$-2)$^{th}$ and 4$k^{th}$ columns in the odd-numbered rows are commonly connected to the same data lines, subpixels of the (4$k$-2)$^{th}$ and 4$k^{th}$ columns in the even-numbered rows are commonly connected to the same data lines, subpixels of the (4$k$-3)$^{th}$ and (4$k$-1)$^{th}$ columns in the even-numbered rows are commonly connected to the same data lines. Hence, the subpixels connected to each of the data lines DL1 to DLm are arranged in a zigzag fashion between the odd-numbered and even-numbered rows, with respect to the connected data line.

In this configuration, R, G and B color subpixels in the same row are connected to their adjacent data lines DL1 to DLm in the same direction from the R, G and B color subpixels. In other words, if subpixels in the odd-numbered rows are connected to data lines on the left of them, subpixels in the even-numbered rows are connected to data lines on the right of them.

Among the R, G and B color subpixels in the odd-numbered rows, the subpixels of the (4$k$-3)$^{th}$ and (4$k$-2)$^{th}$ columns are connected to the odd-numbered gate lines GL1, GL3, GL5, . . . , GLn-1, whereas subpixels of the (4$k$-1)$^{th}$ and 4$k^{th}$ columns are connected to the even-numbered gate lines GL2, GL4, GL6, . . . , GLn. Among the R, G and B color subpixels in the even-numbered rows, the subpixels of the (4$k$-2)$^{th}$ and (4$k$-1)$^{th}$ columns are connected to the odd-numbered gate lines GL1, GL3, GL5, . . . , GLn-1, whereas subpixels of the (4$k$-3)$^{th}$ and 4$k^{th}$ columns are connected to the even-numbered gate lines GL2, GL4, GL6, . . . , GLn.

Thus all subpixels connected to the same data lines in the odd-numbered and even-numbered rows are driven on a frame basis by the gate lines GL1 to GLn-1 that are sequentially driven.

The LCD device illustrated in FIG. 4 is almost the same as the LCD device illustrated in FIG. 1, except for the layout of subpixels in the liquid crystal panel 2. Thus, a description of the other components except the liquid crystal panel 2 will not be provided herein.

Figure 5:
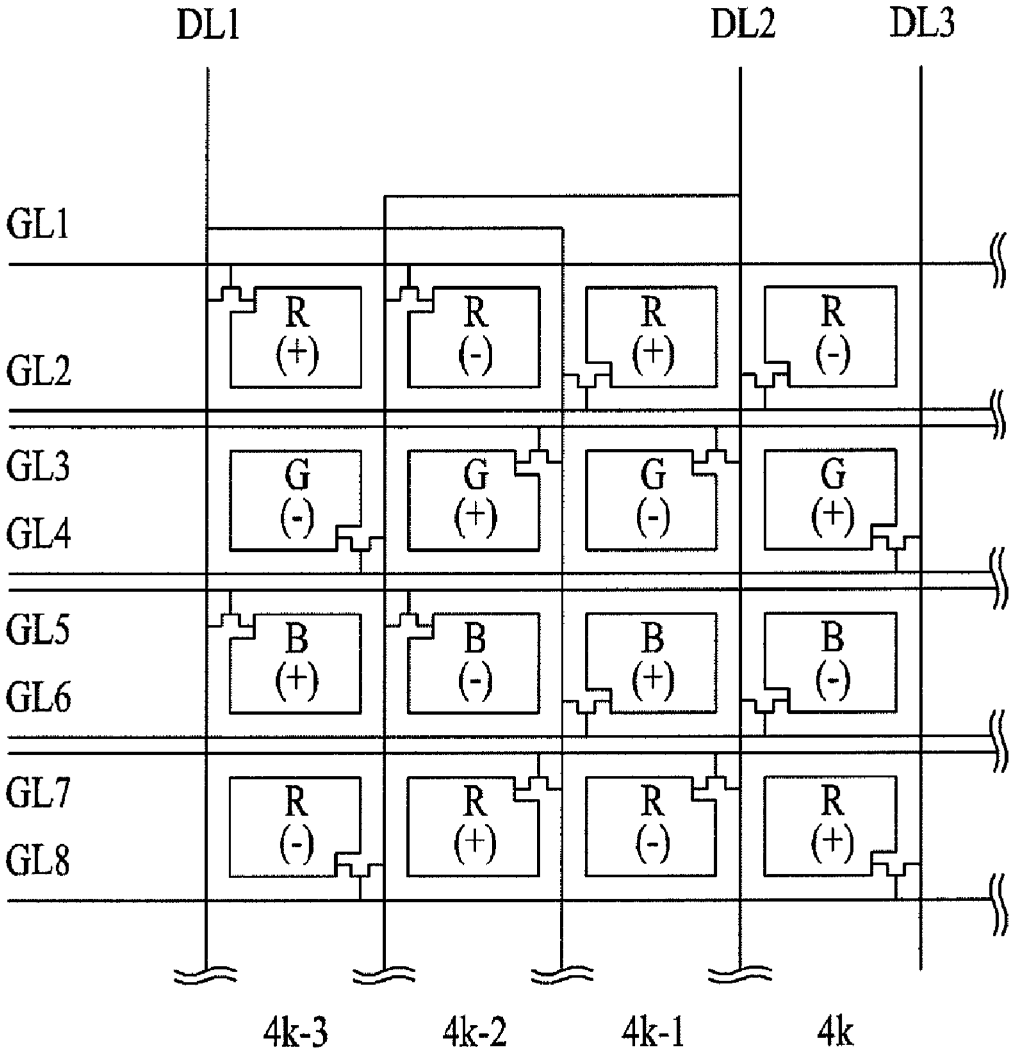
FIG. 5 illustrates subpixels charged with image signals during each frame period.
Figure 6:
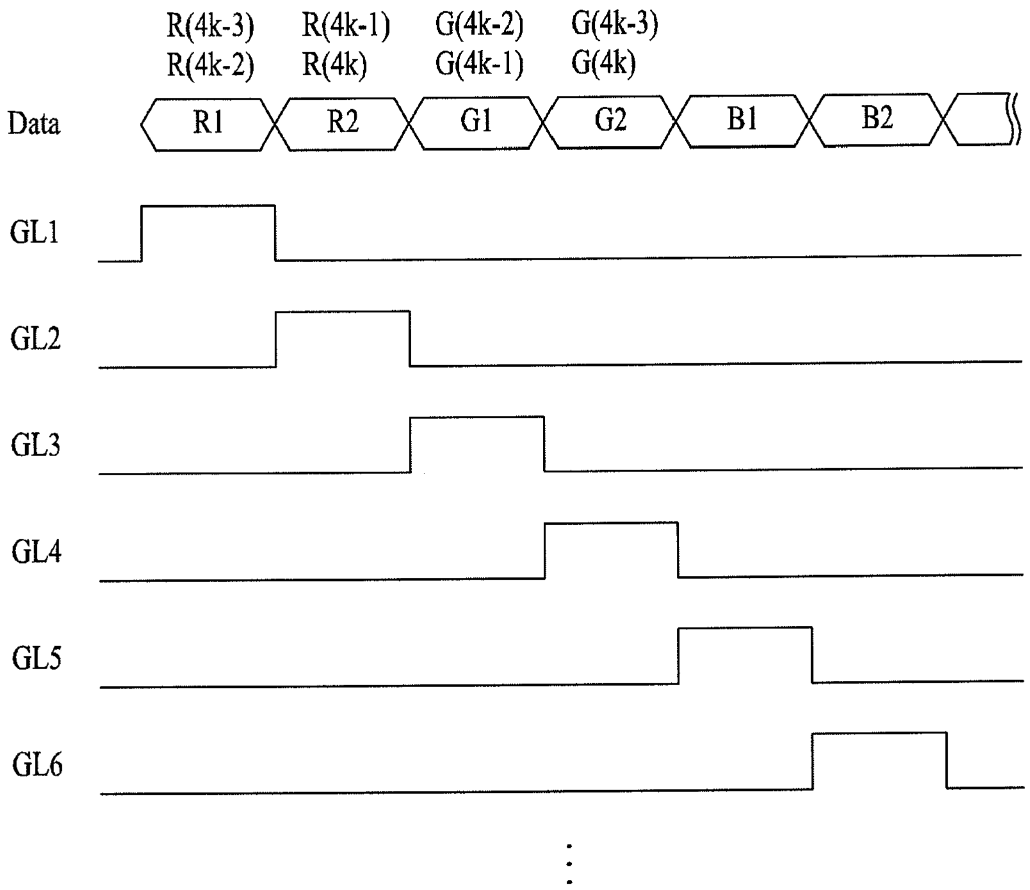
FIG. 6 is a waveform diagram referred to for describing a method for driving a liquid crystal panel illustrated in FIG. 5.

FIG. 5 illustrates subpixels charged with image signals during each frame period and FIG. 6 is a waveform diagram referred to for describing a method for driving the liquid crystal panel illustrated in FIG. 5.

Referring to FIG. 5, the liquid crystal panel 2 is driven by inverting the polarities of the data lines DL1 to DLm in each frame such that the polarity of the odd-numbered data lines DL1, DL3, DL5, . . . , DLm-1 is opposite to the polarity of the even-numbered data lines DL2, DL4, DL6, . . . , DLm according to a column inversion technique. Therefore, the subpixels in the columns connected to the odd-numbered data lines DL1, DL3, DL5, . . . , DLm-1 are charged with data of the same polarity, whereas the subpixels in the columns connected to the even-numbered data lines DL2, DL4, DL6, . . . , DLm are charged with data of the polarity opposite to the polarity of the data charged in the subpixels in the columns connected to the odd-numbered data lines DL1, DL3, DL5, . . . , DLm-1. The polarities of the subpixels are inverted on a frame basis. As a consequence, the LCD device according to this exemplary embodiment can achieve the effects of dot inversion driving, despite driving the liquid crystal panel 2 by column inversion, thereby further improving image quality.

Referring to FIG. 6, the timing controller 8 arranges RGB image data and provides the arranged RGB image data to the data driver 4 each time for at least one horizontal line such that an image is displayed at the subpixels of the $(4k-3)^{th}$ and $(4k-2)^{th}$ columns during a half of an odd-numbered horizontal period and at the subpixels of the $(4k-1)^{th}$ and $4k^{th}$ columns during the other half of the odd-numbered horizontal period, in order to display an image for every frame period. Also, the timing controller 8 arranges RGB image data and provides the arranged RGB image data to the data driver 4 each time for at least one horizontal line such that an image is displayed at the subpixels of the $(4k-2)^{th}$ and $(4k-1)^{th}$ columns during a half of an even-numbered horizontal period and at the subpixels of the $(4k-3)^{th}$ and $4k^{th}$ columns during the other half of the even-numbered horizontal period. The timing controller 8 generates the gate control signal GSC and the data control signal DCS and provides the gate control signal GSC and the data control signal DCS respectively to the gate driver 6 and the data driver 4.

The data driver 4 converts the arranged image data to analog image signals and provides the analog image signals to the data lines DL1 to DLm on a half horizontal period basis in such a manner that an image is displayed at the subpixels of the $(4k-3)^{th}$ and $(4k-2)^{th}$ columns during one half of an odd-numbered horizontal period and at the subpixels of the $(4k-1)^{th}$ and $4k^{th}$ columns during the other half of the odd-numbered horizontal period. Also, the data driver 4 converts the arranged image data to analog image signals and provides the analog image signals to the data lines DL1 to DLm on a half horizontal period basis in such a manner that an image is displayed at the subpixels of the $(4k-3)^{th}$ and $4k^{th}$ columns during one half of an even-numbered horizontal period and at the subpixels of the $(4k-2)^{th}$ and $(4k-1)^{th}$ columns during the other half of the even-numbered horizontal period.

Therefore, the subpixels in the $(4k-3)^{th}$ and $(4k-2)^{th}$ pixel columns to which a gate-on voltage is supplied through the first gate line GL1 among the R color subpixels arranged in the uppermost horizontal row are charged with R image signals R1 provided through the data lines DL1 to DLm, as illustrated in FIG. 5. Then the R color subpixels in the $(4k-1)^{th}$ and $4k^{th}$ pixel columns to which a gate-on voltage is supplied through the second gate line GL2 among the R color subpixels arranged in the uppermost horizontal row are charged with R image signals R2 provided through the data lines DL1 to DLm.

Subsequently, the G color subpixels in the $(4k-2)^{th}$ and $(4k-1)^{th}$ pixel columns to which a gate-on voltage is supplied through the third gate line GL3 among the G color subpixels arranged in the second horizontal row are charged with G image signals G1 provided through the data lines DL1 to DLm. Then the G color subpixels in the $(4k-3)^{th}$ and $4k^{th}$ pixel columns to which a gate-on voltage is supplied through the fourth gate line GL4 among the G color subpixels arranged in the second horizontal row are charged with G image signals G2 provided through the data lines DL1 to DLm. In this manner, subpixels connected to the gate lines GL1 to GLn to which gate-on voltages are sequentially supplied are sequentially charged with image signals R1 to B2 during every frame period, thus displaying an image.

As described above, the LCD device according to this exemplary embodiment of the present invention can reduce the number of data driving ICs in the data driver 4 by three to six times, compared to a conventional liquid crystal panel. In addition, dot inversion is effected as well although column inversion is performed, thus reducing power consumption and improving image quality. Since subpixels are connected to the data lines DL1 to DLm that are positioned in different directions from the subpixels according to whether they are in the odd-numbered rows or the even-numbered rows, image quality degradation caused by the difference between the parasitic capacitances of TFTs is overcome. As a consequence, image quality is improved and power consumption is reduced as well.

As is apparent from the above description, the apparatuses for driving an LCD device according to the exemplary embodiments of the present invention can decrease the number of data driving ICs by three to six times. In addition, the apparatuses and methods for driving an LCD device according to the present invention can improve image quality by overcoming image quality degradation caused by the difference between the parasitic capacitances of pixels, and further decrease power consumption.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. An apparatus for driving a Liquid Crystal Display (LCD) device, comprising:

a liquid crystal panel in which a plurality of subpixels arranged on each horizontal line are commonly connected to at least one adjacent data line, and on at least one horizontal line basis, a plurality of subpixels are connected to at least one adjacent data line through Thin Film Transistors (TFTs) of the subpixels from a same direction with respect to the at least one adjacent data line;

a data driver for driving a plurality of data lines;

a gate driver for driving a plurality of gate lines; and a timing controller for arranging externally received image data according to arrangement of subpixel columns commonly connected to each data line, providing the arranged image data to the data driver, and controlling driving timings of the gate driver and the data driver, wherein odd-numbered data lines among the plurality of data lines are branched to be connected to TFTs of the subpixels of $(4k-3)^{th}$ and $(4k-1)^{th}$ columns so that the subpixels of $(4k-3)^{th}$ and $(4k-1)^{th}$ columns are connected in parallel to the same data lines, even-numbered data lines among the plurality of data lines are branched to be connected to TFTs of the subpixels of $(4k-2)^{th}$ and $4k^{th}$ columns so that the subpixels of $(4k-2)^{th}$ and $4k^{th}$ columns are connected in parallel to the same data lines, wherein the k being a natural number larger than 1, and wherein, in a period for displaying an image on at least one frame basis, the timing controller controls an image to be displayed at the same time at pixels of the $(4k-3)^{th}$ and $4k$-2)$^{th}$ columns during at least one half of a horizontal period or during one horizontal period and controls an image to be displayed at the same time at pixels of ($4k$-1)$^{th}$ and $4k^{th}$ columns during the other half of the horizontal period or during a next horizontal period.

2. The apparatus according to claim 1, wherein in the liquid crystal panel, a plurality of subpixels of a same color are arranged along each of the gate lines, a plurality of subpixels of three colors are arranged along each of the data lines, subpixels of ($4k$-3)$^{th}$ and $4k$-1)$^{th}$ columns are commonly connected to a same data line, and subpixels of ($4k$-2)$^{th}$ and $4k^{th}$ columns are commonly connected to a same data line.

3. The apparatus according to claim 2, wherein the subpixels of ($4k$-3)$^{th}$ and ($4k$-2)$^{th}$ columns are connected to odd-numbered gate lines, and the subpixels of ($4k$-1)$^{th}$ and $4k^{th}$ columns are connected to even-numbered gate lines.

4. The apparatus according to claim 1, wherein in the liquid crystal panel, a plurality of subpixels of a same color are arranged along each of the gate lines, a plurality of subpixels of three colors are arranged along each of the data lines, subpixels of ($4k$-3)$^{th}$ and ($4k$-1)$^{th}$ columns in each odd-numbered row are commonly connected to a same data line, subpixels of ($4k$-2)$^{th}$ and $4k^{th}$ columns in each odd-numbered row are commonly connected to a same data line, subpixels of the ($4k$-2)$^{th}$ and $4k^{th}$ columns in each even-numbered row are commonly connected to a same data line, and subpixels of the ($4k$-3)$^{th}$ and ($4k$-1)$^{th}$ columns in each even-numbered row are commonly connected to a same data line.

5. The apparatus according to claim 4, wherein the subpixels of the ($4k$-3)$^{th}$ and ($4k$-2)$^{th}$ columns in each odd-numbered row are connected to odd-numbered gate lines, the subpixels of the ($4k$-1)$^{th}$ and $4k^{th}$ columns in each odd-numbered row are connected to even-numbered gate lines, the subpixels of the ($4k$-2)$^{th}$ and ($4k$-1)$^{th}$ columns in each even-numbered row are connected to the odd-numbered gate lines, the subpixels of the ($4k$-3)$^{th}$ and $4k^{th}$ columns in each even-numbered row are connected to the even-numbered gate lines.

6. The apparatus according to claim 5, wherein in a period for displaying an image on at least one frame basis, the timing controller controls an image to be displayed at pixels of the ($4k$-3)$^{th}$ and ($4k$-2)$^{th}$ columns during an odd-numbered horizontal period or during one half of the odd-numbered horizontal period and controls an image to be displayed at pixels of ($4k$-1)$^{th}$ and $4k^{th}$ columns during the other half of the odd-numbered horizontal period or during one horizontal period, and wherein during the period for displaying an image on at least one frame basis, the timing controller controls an image to be displayed at the pixels of the ($4k$-2)$^{th}$ and ($4k$-1)$^{th}$ columns during an even-numbered horizontal period or during one half of the even-numbered horizontal period and controls an image to be displayed at the pixels of ($4k$-3)$^{th}$ and $4k^{th}$ columns during the other half of the even-numbered horizontal period or during one horizontal period.

7. A method for driving a Liquid Crystal Display (LCD) device having a liquid crystal panel in which a plurality of subpixels arranged on each horizontal line are commonly connected to at least one adjacent data line, and on at least one horizontal line basis, a plurality of subpixels are connected to at least one adjacent data line through Thin Film Transistors (TFTs) of the subpixels from a same direction with respect to the at least one adjacent data line, the method comprising:

driving a plurality of data lines;

driving a plurality of gate lines; and arranging externally received image data according to arrangement of subpixel columns commonly connected to each data line, and controlling a driving timing of the data lines, so that the arranged image data are displayed at the subpixels through the plurality of data lines, wherein the controlling of the driving timing data lines comprises controlling an image to be displayed at pixels of the ($4k$-3)$^{th}$ and ($4k$-2)$^{th}$ columns during an odd-numbered horizontal period or during one half of the odd-numbered horizontal period in a period for displaying an image on at least one frame basis, controlling an image to be displayed at pixels of ($4k$-1)$^{th}$ and $4k^{th}$ columns during the other half of the odd-numbered horizontal period or during one horizontal period in the period for displaying an image on at least one frame basis, wherein the k being a natural number larger than 1, and wherein the controlling of the driving timing of the data lines comprises controlling an image to be displayed at the same time at pixels of the ($4k$-3)$^{th}$ and ($4k$-2)$^{th}$ columns during at least one half of a horizontal period or during one horizontal period in a period for displaying an image on at least one frame basis, and controlling an image to be displayed at the same time at pixels of ($4k$-1)$^{th}$ and $4k^{th}$ columns during the other half of the horizontal period or during a next horizontal period in the period for displaying an image on at least one frame basis.

* * * * *